Oct. 29, 1963 R. ARNAUD 3,108,380
GLASS CUTTING APPARATUS
Filed Nov. 3, 1959 2 Sheets-Sheet 2
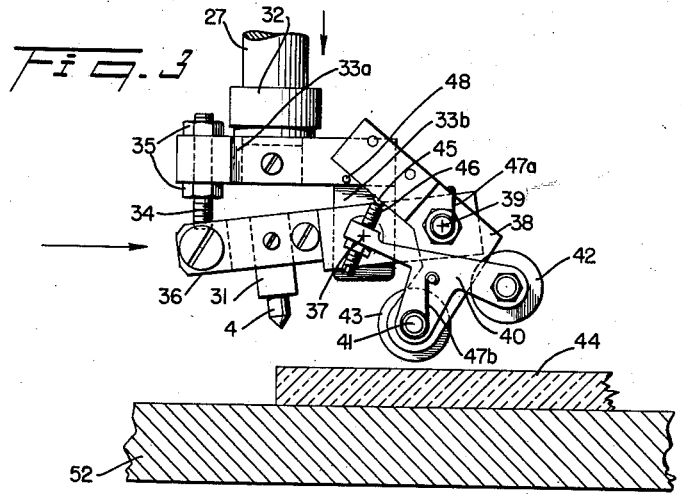
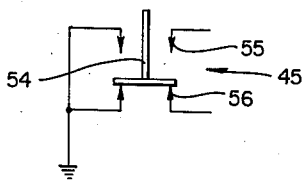
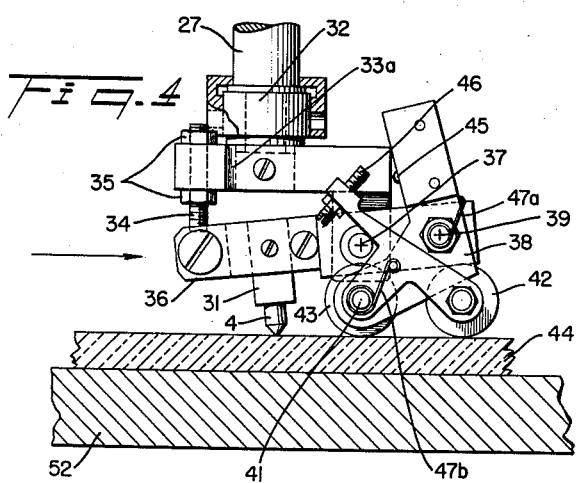
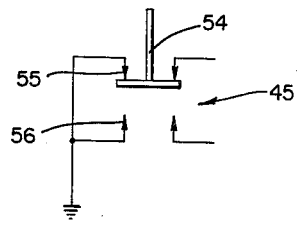
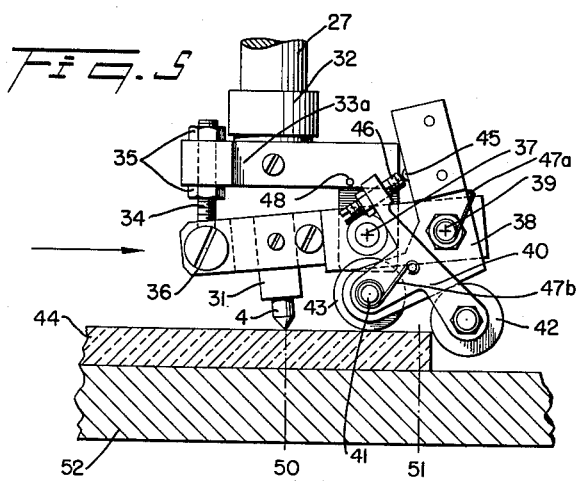
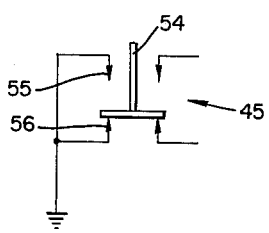
*INVENTOR.*
ROBERT ARNAUD
BY *Bauer and Seymour*
ATTORNEYS

United States Patent Office 3,108,380
Patented Oct. 29, 1963

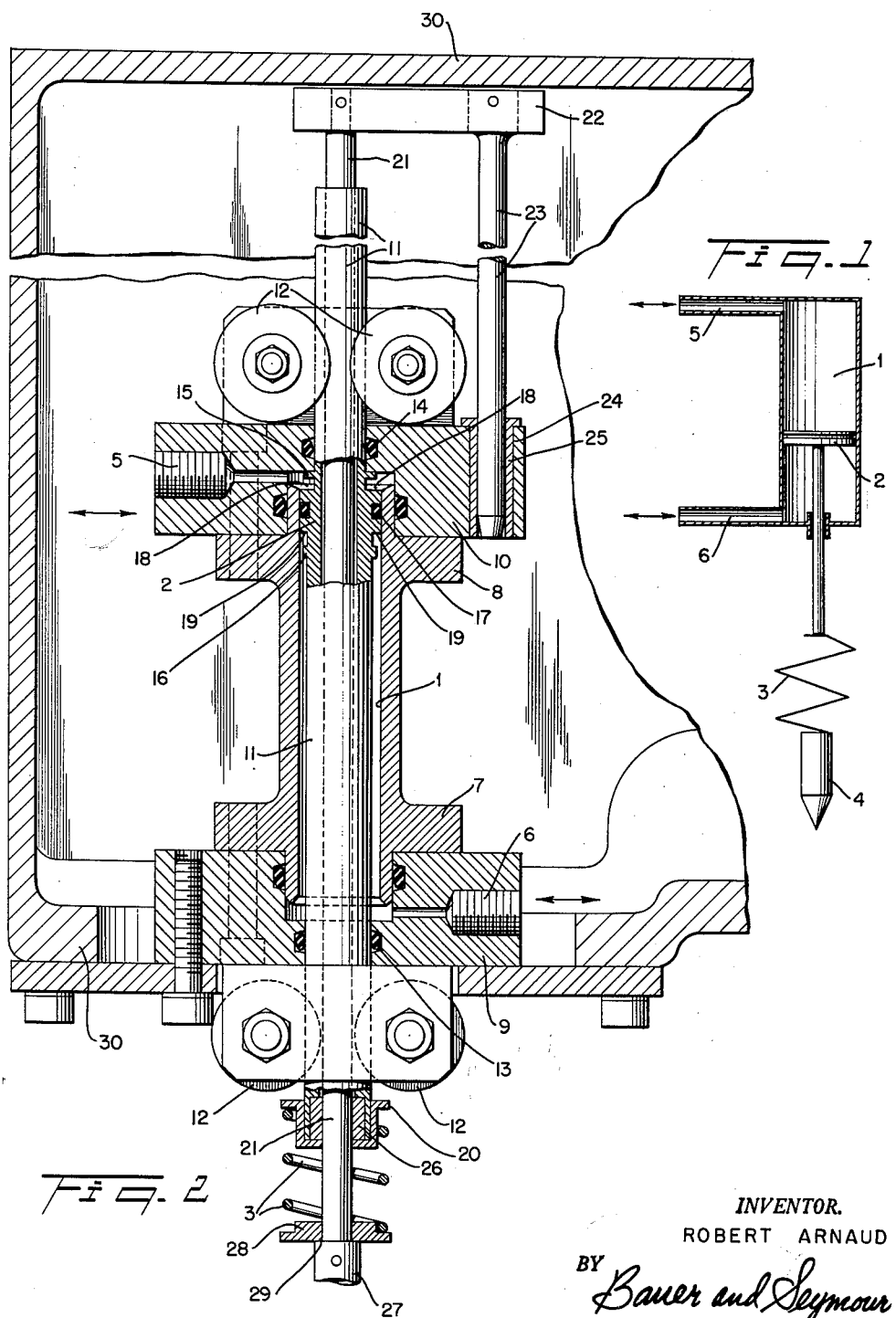

3,108,380
GLASS CUTTING APPARATUS
Robert Arnaud, La Celle-Saint-Cloud, France, assignor to Compagnie de Saint-Gobain, Paris, France
Filed Nov. 3, 1959, Ser. No. 850,673
Claims priority, application France Nov. 10, 1958
18 Claims. (Cl. 33—32)

This invention relates to a mechanism for supporting and operating a glass-cutting tool in glass-cutting apparatus. The mechanism of the invention may be advantageously employed in an automatically controlled glass-cutting machine; in such machine the mechanism of the invention permits the cutting tool to be given with great accuracy the movements thereof required in a glass-cutting operation, that is, the lowering of the tool upon the glass, the traversing of the tool in a cutting stroke across the glass under predetermined pressure, and the raising of the tool at the end of the cutting stroke.

In order to press a glass-cutting tool against the surface of the glass to be cut with a predetermined pressure, there may be employed a spring which exerts a known pressure upon the tool. This arrangeemnt presents difficulties, however, because the spring must be calibrated and must be adjusted for the cutting of each glass piece of different thickness. A pneumatic or hydraulic cylinder may be employed to act directly upon the cutting tool, but in this construction it is necessary to use relatively large pressures in order to make the pneumatic or hydraulic cylinder function properly; such high pressures make it impossible to employ a diamond as the cutting tool.

The presenut invention overcomes the above difficulties, and may be used with either cutting wheel or a diamond as the glass-cutting tool. Briefly, the invention transmits to the tool the pressure necessary to cut glass by the combination of a fluid motor and a spring, the spring being interposed between the tool and the motor and functioning as a damping means.

The invention will be more readily understood by reference to the drawings which show a preferred illustrative embodiment of apparatus in accordance with the invention. Although the drawings show a diamond cutting tool, it is to be understood that the invention is not limited thereto, as indicated above. In the drawings:

FIG. 1 is a schematic view of the mechanism supporting and pressing the tool against the glass;

FIG. 2 is a view in vertical axial section through the tool-supporting carriage of a glass-cutting apparatus, certain other parts being shown in side elevation;

FIG. 3 is a fragmentary view in side elevation of the tool-carrying head of the apparatus and of the feeler mechanism associated therewith, the head being shown as it is being lowered toward the glass before the start of a glass-cutting stroke of the tool;

FIG. 3a is a fragmentary wiring diagram of the control circuit for the apparatus, said diagram particularly showing the position of the contactor of micro-switch 45 in FIG. 3;

FIG. 4 is a view similar to FIG. 3 but with the parts in the position they assume in an intermediate portion of the glass-cutting stroke of the tool;

FIG. 4a is a view similar to FIG. 3a but showing the contactor of micro-switch 45 in the position it assumes in FIG. 4;

FIG. 5 is a view similar to FIGS. 3 and 4 but with the glass-cutting tool approaching the end of its cutting stroke.

FIG. 5a is a view similar to FIGS. 3a and 4a but with the contatcor of micro-switch 45 in the position it assumes in FIG. 5.

As schematically shown in FIG. 1, the support for the tool in accordance with the invention includes a reciprocable fluid cylinder 1 having a piston 2 therein, and a coil compression spring 3 interposed between the piston rod of the motor and the diamond-cutting tool 4. The cylinder 1 has ports 5 and 6 at its opposite ends; such ports are alternatively connected to compressed air and to the atmosphere, whereby to lower or raise the piston 2, as desired.

When ports 5 and 6 are subjected to the same pressure, piston 2 will descend because the upper face of the piston has the greater area, that is, the lower face of the piston is less than that of the upper face thereof in an amount equal to the area of the piston rod. When ports 5 and 6 are thus subjected to pressure, the cutting tool 4 comes near to the glass.

When fluid under pressure is admitted to cylinder 1 through port 5 while port 6 is in communication with the atmosphere, piston 2 exerts a greater downward force, on the compressing spring 3 transmitting this force to tool 4.

The advantage of interposing spring 3 between the fluid motor and the tool becomes evident when fluid under pressure is admitted to the cylinder. With any reciprocable fluid motor there is always, in some degree, a sticking of the piston to the cylinder wall. It is thus necessary initially to apply a force to the piston which is necessary to free it from the cylinder wall, such initial force being greater than that required for the normal travel of the piston. The necessity for such initially larger force produces undesirable results which are overcome by the present invention. The spring 3, interposed between the piston rod and tool 4, acts as a damping device, and permits the tool to cut the glass while being thrust thereagainst with a very small pressure. Another advantage produced by the use of spring 3 becomes apparent during the working stroke of the tool: the surface of the glass may well present differences in level; the use of the spring eliminates irregularities in the cut produced by the tool which would ocur but for the presence of the spring.

It is not necessary to calibrate the spring as it would be if the spring were the sole means employed to exert cutting pressure upon the tool. In accordance with the illustrative embodiment of the invention, the force exerted by the tool 4 upon the glass may be adjusted as required at all times by the simple variation of pressure of the fluid within the fluid cylinder 1 so that the force transmitted is accurate.

Finally, the force transmitted to the tool according to the fluid pressure is independant of the distance between the piston and the surface of the glass in the limits compatible with the course of the piston; this point is important why it is very difficult to obtain a distance strictly constant between the surface of the glass and the cutting tool. When the tool is pushed by a spring the force imparted is controlled by the distance between the glass surface and the tool.

In FIG. 2 there are shown elements of a tool holder embodying the principle of FIG. 1 but adapted for use in an industrial glass-cutting machine. In such machine a sheet or plate of glass 44 (FIGS. 3, 4, and 5) is supported on a horizontal table 52. The carriage 30 of the machine, sliding on horizontal guides (not shown) travels across the glass to form a score line in the upper surface thereof at the desired location. It is to be understood that such machine incorporates driving and control mechansim whereby carriage 30 is caused to travel across the glass sheet, the carriage 30 then being retracted to its initial position.

The cylinder 1 is formed of a tubular body having outwardly directed flanges 7 and 8 on its lower and upper ends, respectively. Flanges 7 and 8 are connected, as by the screws indicated, to end members 9 and 10, respectively. End member 10 is formed with the laterally directed upper port 5, to which a pipe (not shown) is connected, and bottom end member 9 is provided with a laterally directed lower port 6 to which another pipe (not shown) is connected. Ports 5 and 6 are selectively alternatively connected to a source of fluid pressure, such as compressed air, the other port then being connected to the atmosphere. Such means of supply and control of the fluid under pressure may be made up of a pump, a reservoir tank, and a solenoid operated fluid valve interposed between the reservoir tank and the ports 5 and 6. Because such mechanism is conventional, it is not shown herein.

The piston rod is, in the embodiment shown, formed by a tube 11 which is mounted coaxially of the cylinder 1 and is guided for vertical travel by two sets of two opposed guide rollers 12, one set being mounted on the bottom of member 9 and the other set being mounted on the top of member 10. Sealing between piston rod 11 and cylinder is obtained by sealing members 13 and 14 located respectively in grooves in members 9 and 10. The sealing means 13 and 14, which may be in the form of O-rings assure a vertical freedom of motion of the piston rod. In its intermediate portion the piston rod 11 is provided with upper and lower annular flanges 15 and 16, respectively, which function to limit its upward and downward travel.

The piston 2 is located in an intermediate zone of piston rod 11, between flanges 15 and 16. Piston 2 closely fits the bore of the cylinder 1. The piston is provided with an appropriate annular packing 17 cooperating with the wall of the cylinder. The area of the upper face 18 of the piston somewhat exceeds the area of the lower face 19 thereof; this is accomplished by making the diameter of the piston rod 11 below the piston greater than the diameter thereof above the piston.

The lower end of piston rod 11 is provided with a flanged fitting 20 which functions as a seat receiving the upper end of coil compression spring 3. Within the interior of piston rod 11 there extends a central rod 21 which is spaced somewhat from the inner wall of the hollow piston rod 11 and slides freely into the hollow rod. The upper end of rod 21 is secured to a horizontal bar 22. A second, shorter vertical rod 23 parallel to rod 21 is affixed to bar 22 so as to be laterally spaced from rod 21. The lower end of rod 23 is slidably received in a bushing 25 which is supported in a passage 24 in a lateral extension of member 10. The thus described construction allows the member made up of elements 21, 22, and 23 to reciprocate vertically while being held from rotation about the axis of rod 21.

At its lower end the rod 21 is accurately guided and slides within a bushing 26 secured to the lower end of piston rod 11. The rod 21 has an enlarged lower end 27, fragmentarily shown in FIG. 2, which functions indirectly as an abutment for the lower end of spring 3 and as a mounting for the head structure shown in FIGS. 3, 4 and 5. The spring 3, mounted coaxial of rod 21, is maintained under compression between the flange of fitting 20, secured to piston rod 11, and a centrally apertured disc 28 positioned about rod 21 and positioned in engagement with the annular shoulder 29 on the top of enlargement 27 on rod 21.

The head of the apparatus bearing the glass-cutting tool and the feeler mechanism for the control thereof is shown in FIGS. 3, 4 and 5. Such head is attached to the lower end of enlargement 27 on rod 21 by a tubular casing 32. Means such as a key (not shown) retains the head from rotation with respect to rod 21. An L-shaped bar 33a is fixedly attached to the casing 32. The free end of arm 33a carries a screw 34 which is provided with checknuts 35 on each side of the arm. A second bar 36 has a bifurcated right-hand end between the branch portions of which the arm 33b depends. Arm 36 is pivotally connected to arm 33b by a pivot pin 37 as shown. The position of bar 36 is determined by screw 34, so that bar 36 may be adjusted angularly somewhat about pivot pin 37. Glass-cutting tool 4 is provided with a mounting wing 31 which is fixedly connected to bar 36, as shown.

The feeler mechanism includes a first angular bar 38 which is pivotally connected to the right-hand end of bar 36 by a pivot pin 39, and a second bar means 40 which is pivotally mounted on the lower end of the lower arm of bar 38 by a pivot pin 41.

A roller 43 is mounted on the lower end of the lower arm of bar 38 by the said pivot pin 41. A second roller 42 is mounted for rotation about the right-hand end of the bar 40. The rollers 42 and 43 may be rolled on the glass sheet 44 and are equipped with a switch 45, stud 46 and coil torsion springs 47a and 47b provided at pivot pins 39 and 41, respectively, such torsion springs constantly urging the parts to the positions thereof shown in FIG. 3, that is, spring 47a urges bar 38 counterclockwise against the stop pin 48 on arm 33a, and spring 47b urges bar 40 clockwise about pivot pin 41 and presses a stud 46 on bar 40 against switch 45. The switch 45 is mounted on bar 38 so as to cooperate with said abutment stud 46, which is adjustably mounted in a boss 37 on bar 40, as shown. When stud 46 engages switch 45 as in FIGS. 3 and 5, the movable contactor 54 of the switch is in its lower position, as shown in FIGS. 3a and 5a, so as to bridge the two lower contacts 56. When the abutment stud 46 is relieved from contact with switch 45 the movable contactor 54 of the switch occupies its upper position (FIG. 4a) wherein it bridges the upper contacts 55.

The carriage 30 of the machine having been placed in its starting position, and the glass 44 being at the correct position on table 52, the control of a cutting operation requires first the lowering of the tool on the glass; for this purpose and under the action of an automatic cycle that can only start when the tool support is locked in the starting position and when the glass sheet is correctly positioned by convenient means, the electro-valves connected to ports 5 and 6 are simultaneously open and subjected to the same pressure: the piston goes down. During its lowering the piston, acting through spring 3, thrusts the rod 21 downwardly rotation of said rod 21 being prevented by guide rod 23.

Rollers 42—43 of the feeler first contact the glass 44.

The consequent pivoting of bars 38—40 (FIG. 4) will separate elements 45—46 of the micro-switch and, consequently, will produce the interlocking of a suitable electrical circuit comprising the aforementioned electro-valves. As soon as port 6 is closed, the fluid motor is locked. The cutting-tool is then at a small distance above the glass. The cutting tool is then automatically lowered by putting port 6 in communication with atmosphere and furnishing compressed air at a predetermined pressure at port 5, this depresses the tool-support downwardly toward the glass.

FIG. 4 shows the apparatus at the moment where the cutting tool comes into contact with the glass sheet. The pressure is transmitted to the tool 4 by piston rod 11 and spring 3. The travelling of carriage 30 allows the drawing of the cutting line by tool 4.

FIG. 5 shows the position of the head near the end of the cutting stroke. The roller 42, having run off the edge of the glass 44, pivots under the action of spring 47b, whereby abutment stud 46 again contacts switch 45. This places contactor 54 in its lower position, and causes port 5 to be connected to the atmosphere and port 6 to be connected to the source of air under pressure. Accordingly, piston 11 is raised so that tool 4 is elevated from the glass. The carriage 30 will then be retracted to its initial starting position by control and driving means, not shown. Such tool raising operation, although very rapid, is not instantaneous. As a consequence, the speed of the carriage 30 must be related to the constant interval of time which is required for the micro-switch, so that the tool 4 will cover the zone of the glass between the positions 50 and 51 (FIG. 5) before the tool is raised.

It is also possible to stop the cutting carriage when the roller 42 pivots and then to raise the tool. When the tool is raised, the carriage returns to its starting position.

It should be noted that the use of an interposed spring between the fluid motor and the tool not only allows the cutting pressure of the tool to be varied as desired, but also brings such pressure under automatic control, without manual intervention, regardless of changes in the thickness of the glass, its characteristics, and the state of its surface. The apparatus of the present invention permits the realization of a substantially constant cutting pressure at all times, regardless of differences in level and thickness of the glass. The score line or cut may thus be made with great precision. As an example, when a cutting wheel is employed the necessary pressure is of the order of 2,500 kg.; with the present invention such pressure may be regulated to within ±100 gr. of such value When a diamond is employed as the glass-cutting tool, the cutting pressure is about 500 g., and such pressure may be maintained by the apparatus to within ±50 g. of such value. Such precision of maintenance of a desired cutting pressure allows the practical use of a diamond as a cutting tool for the first time in an automatic glass-cutting apparatus.

Although only one embodiment of the glass-cutting apparatus of the invention has been illustrated in the drawings and described in the foregoing specification, it is to be expressly understood that various changes, such as in the relative dimensions of the parts, the materials used and the like, may be made therein without departing from the spirit and scope of the invention as will now be apparent to those skilled in the art.

What is claimed is:

1. In glass cutting apparatus having a support for a piece of glass, a carriage, a glass cutting tool on the carriage, and means to move the carriage and the support relative to each other in a glass cutting stroke, the improvement which comprises, in combination, a reciprocable fluid motor on the carriage and comprising a cylinder and a piston reciprocable therein, and a spring interposed between the piston and the tool, said spring transmitting to the tool the fluid pressure of the motor and acting as a damping and cushioning device.

2. Glass cutting apparatus as defined in claim 1, comprising a tool-mounting rod which extends through the piston coaxially thereof and has sliding engagement therewith, the spring being interposed between the piston and the end of the second rod nearest the tool.

3. Glass cutting apparatus as defined in claim 2, comprising means for maintaining said rod from rotation about its axis.

4. In glass cutting apparatus having a support for a piece of glass, a carriage, a tool holder on the carriage, means to move the carriage and the support relative to each other in a glass cutting stroke, and means to move the tool holder toward and away from the piece of glass, the improvement which comprises a feeler mechanism secured to the tool holder and associated with the tool, the tool holder and feeler mechanism being mounted to move together toward and away from the piece of glass, said feeler mechanism detecting the presence of the piece of glass and its vertical distance with respect to the tool, and control means actuated by the feeler mechanism selectively to energize the means to move the tool toward and away from the piece of glass.

5. Glass cutting apparatus as defined in claim 4, comprising a coil compression spring interposed between the tool and the means for moving the tool toward and away from the piece of glass.

6. Glass cutting apparatus as defined in claim 4, wherein the means to move the tool toward and away from the piece of glass comprises a reciprocable fluid motor, a source of fluid under pressure, and a reversing valve interposed between such source and the motor, the control means being connected to the valve selectively to reverse the valve.

7. Glass cutting apparatus as defined in claim 6, wherein the feeler mechanism includes a micro-switch, the reversing valve is electromagnetically operated, and the feeler mechanism functions to stop the downward feeding of the tool when it encounters the piece of glass and to raise the tool when the tool approaches the far edge of the piece of glass at the end of the cutting stroke of the tool.

8. Glass cutting apparatus as defined in claim 7, wherein the switch is in position to raise the tool when the feeler mechanism is not in contact with the piece of glass, and comprising means to lower the tool, the switch then functioning to hold the tool in contact with the glass until the feeler mechanism becomes disengaged from the glass.

9. Glass cutting apparatus as defined in claim 8, wherein the feeler mechanism comprises a support, a bar mounted on the support, the tool being connected to said bar, a glass engaging member pivotally mounted on the first end of the bar, a lever pivotally mounted on the member, said lever having a glass engaging first end, the other, second end of the lever and of the member approaching each other when the feeler mechanism is removed from the glass and travelling away from each other when the feeler mechanism forcibly engages the glass, the micro-switch being supported on the second end of the member and being operated by the second end of the lever.

10. Apparatus according to claim 4 in which the feeler is provided for detecting the position of the tool in relation to the end of the sheet of glass in order to produce the raising of the tool when said tool is at a small predetermined distance from the edge of the sheet.

11. In glass cutting apparatus, a glass cutting tool, a movable element, fluid pressure operated means for applying pressure to the movable element, pressure transmitting spring means interposed between the element and the tool, and automatic means adapted to control the movement of the element, said automatic means including sensing means movable with the tool, said sensing means being adapted to control the automatic means once a cutting operation has been initiated.

12. Glass cutting apparatus as claimed in claim 11, wherein the automatic means comprises electromagnetic valves controlling the supply of fluid under pressure to the fluid pressure operated means, and the sensing means includes a microswitch operable to control the automatic means.

13. Glass cutting apparatus as claimed in claim 12, wherein the sensing means operates the automatic means to stop the tool at the end of its cutting stroke and thereafter to raise the tool from the glass.

14. Glass cutting apparatus as claimed in claim 13, wherein the sensing means detects the edge of the piece of glass and operates the automatic means to raise the tool from the piece of glass when the tool has reached a position lying a predetermined distance from such edge of the piece of glass.

15. A glass cutting apparatus as claimed in claim 1, comprising a feeler mechanism for controlling the admission of fluid under pressure into the fluid motor, the feeler mechanism having two elements, means mounting each of the elements for pivotal movement about an axis, each element having a roller adapted to roll upon the piece of glass during the cutting stroke of the tool, a microswitch having contacts and being associated with the elements, a spring tending to maintain the contacts of the microswitch in a first terminal position thereof when the rollers are not in contact with the piece of glass, the mechanism being so constructed and arranged that engagement of the two rollers with the piece of glass causes movement of the contacts of the microswitch to a second terminal position, and an electric circuit having the microswitch interposed therein, said circuit controlling the admission of fluid under pressure into the cylinder of the motor to compress the cutting tool against the piece of glass.

16. An apparatus in accordance with claim 15, wherein one of the rollers is mounted in advance of the other in the direction of the cutting stroke of the tool, at the end of the cutting stroke of the tool the advance roller detects the edge of the piece of glass, and comprising means operatively connecting the element mounting the advance roller and the microswitch whereby the said pivoting of such element causes the contacts of the microswitch to move to said second terminal position thus to cause admission of fluid under pressure into the cylinder of the motor to raise the piston and retraction of the cutting tool from the glass when the tool has reached a position which is a predetermined distance short of the edge of the glass.

17. Glass cutting apparatus in accordance with claim 1, which comprises a feeler mechanism having an oscillatory arm carrying a roller which rolls on the piece of glass and which is movable with the tool during a cutting stroke of the tool, a microswitch, means operatively connecting the arm to the microswitch, and an electric circuit in which the microswitch is interposed, the circuit controlling admission to or exhaustion from the cylinder of the motor of fluid and thus the consequent movement of the piston of the motor.

18. A glass cutting apparatus as claimed in claim 17, wherein the fluid motor is double-acting, the roller is disposed a predetermined distance in advance of the tool in the direction of the travel of the tool in its cutting stroke, and the pivoting of the roller upon the edge of the piece of glass causes actuation of the microswitch to reverse the feeding of the fluid to a cylinder of the motor so as to retract the tool from the piece of glass when the tool is a small distance from the edge of the piece of glass.

References Cited in the file of this patent

UNITED STATES PATENTS

| | | |
|---|---|---|
| 435,390 | Broadwell | Sept. 2, 1890 |
| 1,124,784 | Monro | Jan. 12, 1915 |
| 1,594,482 | Wentz et al. | Aug. 3, 1926 |
| 2,022,739 | Rosin | Dec. 3, 1935 |
| 2,265,955 | Roberts et al. | Dec. 9, 1941 |
| 2,278,273 | Limbers | Mar. 31, 1942 |
| 2,361,049 | Oakes | Oct. 24, 1944 |
| 2,515,076 | Brichard | July 11, 1950 |
| 2,556,757 | Guild | June 12, 1951 |
| 2,595,402 | Morris | May 6, 1952 |